3,171,777
O-ALKYL AND O-ALKENYL-O-(2-HALO-4-NITRO-PHENYL)ALKYL PHOSPHONOTHIOATES AND PESTICIDAL METHODS EMPLOYING SAME

Charles Szabo, Yonkers, N.Y., and Richard C. Maxwell, San Jose, Calif., assignors to Stauffer Chemical Company, a corporation of Delaware
No Drawing. Filed Sept. 4, 1959, Ser. No. 838,022
16 Claims. (Cl. 167—30)

This invention relates to certain novel phosphonates and the use of such phosphonates as acaricides and insecticides and more particularly relates to compounds of the structure:

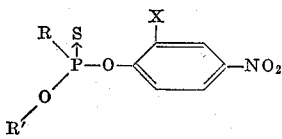

wherein R is a low alkyl radical, R' is selected from the class consisting of lower alkyl and lower alkenyl and X is selected from the class consisting of chlorine and bromine.

Typical compounds of the present invention can be made in accordance with the following methods (code numbers have been assigned to each of the compounds and are used in the balance of the specifications):

EXAMPLE 1 (N-2230)

*O-ethyl-O-(2-chloro-4-nitro-phenyl)-ethyl phosphonothioate*

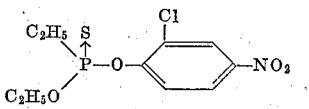

$C_2H_5PSCl_2$ (13 g.) and benzene (70 ml.) were placed in a three-necked reaction flask, equipped with stirrer, reflux condenser, thermometer and dropping funnel. A solution of sodium (1.85 g.) in ethanol (50 ml.) is added dropwise to the above mixture, keeping the temperature below 10° C., with the aid of an ice bath. NaCl then separates. When the addition is completed, the mixture is allowed to warm to room temperature. Acetone (200 ml.) and 2-chloro-4-nitro-phenol (14 g.) are then added and the mixture is stirred until the phenol is dissolved. Then $Na_2CO_3$ (20 g.) is added. This addition results in a slight rise in temperature. Subsequently, the mixture is heated to reflux temperature for ½ hour. After cooling, it is filtered with suction and the solvents are stripped off at reduced pressure. The residue is taken up in benzene (70 ml.) and washed with 5% NaOH solution (70 ml.); afterwards, the organic layer is twice washed with water to remove traces of NaOH. It is then dried over $CaCl_2$. The product is obtained in 73% yield (25.8 g.) after removing the solvent at reduced pressure. Further purification may be carried out by washing the product with ligroin-type solvents. The yellow product has a refractive index $N_D^{25}$ of 1.5683.

*Analysis.*—Calculated percent: C, 38.7; H, 4.18; Cl, 11.5; N, 4.52; P, 10.1; S, 10.3. Found percent: C, 39.9; H, 4.22; Cl, 11.0; N, 4.75; P, 10.1; S, 10.5.

EXAMPLE 2 (N-2310)

*O-methyl-O-(2-chloro-4-nitrophenyl)-ethyl phosphonothioate*

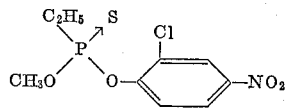

O-methyl-ethylphosphonochloridothioate (10.6 g.), 2-chloro-4-nitrophenol (11.6 g.) and acetone (100 ml.) are placed in the same type of reactor as in Example 1 and the mixture is stirred until the phenol is dissolved. Then $Na_2CO_3$ (15 g.) is added and the mixture refluxed for 45 minutes. The product is worked up as the ethoxy analog in Example 1. A red oil is obtained in a yield of 83% (16 g.) which has a refractive index $N_D^{25}$ of 1.5797.

*Analysis.*—Calculated percent: C, 36.8; H, 3.72; Cl, 12.1; N, 4.8; S, 10.8. Found percent: C, 37.05; H, 3.74; Cl, 12.19; N, 5.3; S, 11.3.

EXAMPLE 3 (N-2361)

*O-ethyl-O-(2-chloro-4-nitrophenyl)-isobutyl phosphonothioate*

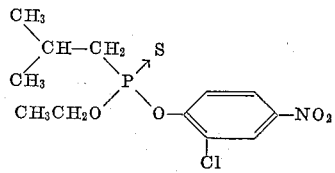

The preparation was made in exactly the same way as in Example 2 using O-ethyl-isobutylphosphonochloridothioate (18 g.), 2-chloro-4-nitrophenol (17.5 g.), acetone (100 ml.) and anhydrous $Na_2CO_3$ (15 g.). The product is a light yellow oil, with a refractive index $N_D^{25}$ 1.5534. It solidified to light yellow crystals which melt at 45° C. Yield: 67% (21.5 g.). A recrystallized sample (from n-heptane) melted at 48.5° C.

*Analysis.*—Calculated percent: C, 42.55; H, 5.02; Cl, 10.65; N, 4.15; S, 9.65. Found percent: C, 43.09; H, 5.05; Cl, 10.75; N, 4.56; S, 10.00.

EXAMPLE 4 (N-2396)

*O-(2-propynyl)-(2-chloro-4-nitrophenyl)-ethyl phosphonothioate*

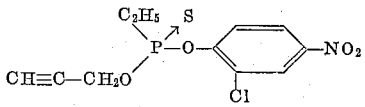

2-propynyl-1-ol (5.6 g.), triethyl amine (10.1 g.) and methylethyl ketone (100 ml.) are mixed in a reactor as in Example 1. The mixture is cooled below 10° C. with the aid of an ice bath and the addition of $EtPSCl_2$ is started, strictly maintaining the reaction temperature below 10° C. by regulating the pace of the addition. When the addition of the ethyl phosphono dichloridothioate is completed, the ice bath is removed and the reaction mixture is allowed to warm by itself to 30° C. When the temperature starts sinking, 2-chloro-4-nitrophenol (17.4 g.) is added and the mixture stirred until the phenol goes into solution. The mixture is then cooled to 10° C. again by an ice bath and additional Et₃N (10.1 g.) is added dropwise within 3 minutes. During the addition of the latter, the temperature gradually rises to 25° C. The mixture is stirred for about 10 minutes at room temperature and afterwards heated to reflux (83° C.) for 15 minutes, then allowed to cool to room temperature. The reaction mixture is worked up as in the previous preparations. A dark yellow oily product is obtained in 80% yield (25.6 g.), with a refractive index $N_D^{25}$ of 1.5867.

*Analysis.*—Calculated percent: C, 40.8; H, 3.45; Cl, 11.3; P, 9.7; S, 10.1. Found percent: C, 39.8; H, 3.56; Cl, 11.7; P, 9.64; S, 10.23.

EXAMPLE 5 (N-2404)

*O-isopropyl-O-(2-chloro-4-nitrophenyl)-ethyl phosphonothioate*

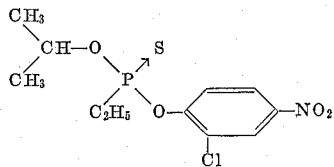

EtPSCl₂ (16.3 g.) is dissolved in ether (200 ml.) and a solution of sodium (2.3 g.) in isopropanol (150 ml.) is added with rapid stirring at about −20° C. When the addition is completed, the mixture is allowed to warm to room temperature. Water (150 ml.) is added to the reaction mixture, and the ethereal layer is then separated, washed with water, conc. CaCl₂ solution and water again and finally dried on CaCl₂. The dried solution is placed in a reactor and 2-chloro-4-nitrophenol (17.4 g.) is added. Triethyl amine (10.1 g.) is now added from a dropping funnel dropwise. This operation results in a rise in temperature. The separation of the hydrochloride does not start below 30° C. When the addition is completed, the mixture is heated to reflux (40° C.) for 3 hours. The hydrochloride is filtered off and the filtrate is worked up, as in the previous examples. The product, a pale yellow oil with a refractive index $N_D^{25}$ of 1.5758, is obtained.

*Analysis.*—Calculated percent: C, 40.5; H, 4.6; P, 9.6. Found percent: C, 39.9; H, 4.0; P, 10.0.

EXAMPLE 6 (N-2500)

*O-ethyl-O-(2-bromo-4-nitrophenyl)-ethyl phosphonothioate*

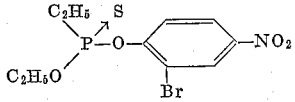

EtP(S)(OEt)Cl (17.5 g.), 2-bromo-4-nitrophenol (21.8 g.), Na₂CO₃ sicc. (16 g.) and acetone (100 ml.) are placed in a reactor equipped with stirrer and reflux condenser. The mixture is refluxed for one hour, and is then worked up as in the previous examples. The product, obtained in 82% yield (29 g.), is a bright yellow oil, $N_D^{25}$ 1.5774.

The compounds have been tested as insecticides and as acaricides according to the following methods:

*Acaricidal Evaluation Test:* The two-spotted mite, *Tetranychus telarius* (Linn.) is employed in tests for acaricides. Young pinto bean plants are infested with several hundred mites. Dispersions of test compounds are prepared by dissolving half a gram of the toxic material in ten milliliters acetone. This solution is then diluted with water containing 0.015% Vatsol (a sulfonate-type wetting agent) and 0.005% Methocel (methyl cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the column "2 SM" in the table and "PE" indicates the post-embryonic forms.

Insecticidal Evaluation Tests: Six insect species are subjected to evaluation tests for insecticides:

(1) American cockroach (Roach), *Periplaneta americana* (Linn.)
(2) Large milkweed bug (MWB), *Oncopeltus fasciatus* (Dallas)
(3) Pea aphid (PA), *Macrosiphum pisi* (Harris)
(4) Confused flour beetle (CFB), *Tribolium confusum* (Duval)
(5) House fly (HF), *Musca domestica* (Linn.)
(6) Omnivorous looper (OL), *Sabulodes caberata* (Gn.)

The procedure for insects 1, 2, 4 and 5 is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in Petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a Petri dish bottom, allowed to air dry and placed in a cardboard mailing tube. Twenty-five female flies are caged in the tube. The flies are continuously exposed to the known residue of the active compound in the cage. After twenty-four and seventy-two hours, counts are made to determine living and dead insects. The LD-50 values are calculated using well-known procedures.

The evaluation procedure on the pea aphid is as follows: Pinto bean plants are cut off above the root zone and the foliage is dipped in the dispersion of the active compound for fifteen seconds. The stems are then inserted through a small slit in a plastic cover into a bottle of water. As soon as the foliage has dried, each plant is infested with ten second or third instar aphids and caged on the plant. Mortality observations are made seventy-two hours later. Again, LD-50 values are determined and reported under the appropriate abbreviations in the table.

The effectiveness of candidate insecticides on the omnivorous looper (OL) is evaluated by means of a dip bioassay method. Young variegated ivy leaves of standard size are used and second or third instar larvae are employed. A weighed portion of the concentrated material was dissolved in 10 ml. acetone. Aliquots of the acetone solution were thoroughly dispersed in 100 ml. portions of water containing 0.015% and 0.005% Methocel as an emulsifier, the amount of water being sufficient to give concentrations of active ingredient ranging from 0.1% to 0.001%. Leaves of English ivy were dipped for 10 seconds in the test dispersions which were agitated by means of magnetic stirrers and the treated leaves were then air dried. A 9 cm. diameter qualitative filter paper disc was placed in a "Sealright" liquid-tight cardboard food container, 3⅜" in diameter, one pint size. Half a milliliter of distilled water was pipetted on the paper disc and the treated leaf was placed in the container with five larvae. All tests were duplicated. The cages were covered with the bottom of a 4" diameter Petri dish. The treated insects were held at 75° F.±5° for 48 hours. At that time final mortality count was taken. The concentration at which approximately 50% of the test larvae were dead was designated as the LD-50 value.

The following results were obtained:

APPROXIMATE LD-50 VALUES FOR LISTED COMPOUNDS

| Compound | HF [1] | Roach [2] | MWB [2] | CFB [1] | 2 SM [2] | 2 SM Eggs [2] | PA [2] | OL [2] |
|---|---|---|---|---|---|---|---|---|
| N-2230 | [3] 2.5 | [3] 0.01 | 0.02 | [3] 5 | 0.01-0.06 | 0.03 | 0.001-0.005 | 0.01 |
| N-2310 | 2 | 0.03-0.06 | 0.03-0.06 | [3] 5 | >0.25 | >0.25 | 0.005 | 0.001-0.01 |
| N-2361 | 10 | >0.50 | >0.50 | 5 | 0.06-0.12 | [3] 0.06 | | >0.01 |
| N-2396 | 40 | 0.12 | 0.12 | 5 | 0.03-0.06 | 0.06 | | |
| N-2404 | 1 | 0.01 | 0.01 | 1 | 0.005 | 0.005 | | 0.001-0.01 |
| N-2500 | [3] 1 | 0.02 | 0.10 | [3] 1 | 0.03 | 0.03 | | |

[1] Dosage in micrograms per cage.
[2] Dosage in percent concentration.
[3] Lowest dosage tested; the LD-50 is lower than this.

We claim:
1. The compound:

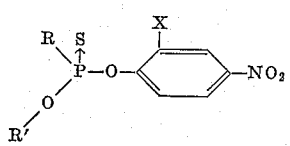

wherein R is lower alkyl, R' is selected from the class consisting of lower alkyl and lower alkynyl and X is selected from the class consisting of chlorine and bromine.

2. A compound having the formula

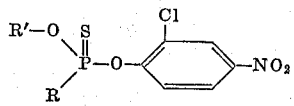

where R' and R are lower alkyl.

3. A compound having the formula

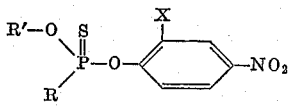

where R' and R are lower alkyl and X is a member of the group consisting of chlorine and bromine.

4. The compound: O-isopropyl-O-(2-chloro-4-nitrophenyl)-ethyl phosphonothioate.

5. The compound: O-ethyl-O-(2-chloro-4-nitrophenyl)-ethyl phosphonothioate.

6. The compound: O-methyl-O-(2-chloro-4-nitrophenyl)-ethyl phosphonothioate.

7. The compound: O-ethyl-O-(2-chloro-4-nitrophenyl)-isobutyl phosphonothioate.

8. The compound: O-(2-propynyl)-(2-chloro-4-nitrophenyl)-ethyl phosphonothioate.

9. The compound: O-ethyl-O-(2-bromo-4-nitrophenyl)-ethyl phosphonothioate.

10. The method of killing pests comprising applying to a pest habitat:

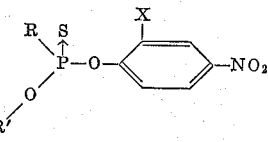

wherein R is lower alkyl, R' is selected from the class consisting of lower alkyl and lower alkynyl and X is selected from the class consisting of chlorine and bromine.

11. The method of killing pests comprising applying to a pest habitat O-isopropyl-O-(2-chloro-4-nitrophenyl)-ethyl phosphonothioate.

12. The method of killing pests comprising applying to a pest habitat O-ethyl-O-(2-chloro-4-nitrophenyl)-ethyl phosphonothioate.

13. The method of killing pests comprising applying to a pest habitat O-methyl-O-(2-chloro-4-nitrophenyl)-ethyl phosphonothioate.

14. The method of killing pests comprising applying to a pest habitat O-ethyl-O-(2-chloro-4-nitrophenyl)-isobutyl phosphonothioate.

15. The method of killing pests comprising applying to a pest habitat O-(2-propynyl)-(2-chloro-4-nitrophenyl)-ethyl phosphonothioate.

16. The method of killing pests comprising applying to a pest habitat O-ethyl-O-(2-bromo-4-nitrophenyl)-ethyl phosphonothioate.

References Cited in the file of this patent

FOREIGN PATENTS 448,123    Italy _____ May 10, 1949

OTHER REFERENCES

Razumov et al.: C.A. 52, col. 293-4 (1958).
Metcalf et al.: "J. Econ. Entomol," vol. 42, 1949, pp. 721-728.